(12) United States Patent
Farah et al.

(10) Patent No.: US 6,447,223 B1
(45) Date of Patent: Sep. 10, 2002

(54) CONTROL FOR HIGH SPEED CUTTING TOOL

(75) Inventors: Charles M. Farah, Westwood; Tamas T. Badics, Maynard, both of MA (US)

(73) Assignee: Parametric Technology Corporation, Needham, MA (US)

( * ) Notice: Subject to any disclaimer, the term of this patent is extended or adjusted under 35 U.S.C. 154(b) by 22 days.

(21) Appl. No.: 09/589,937

(22) Filed: Jun. 7, 2000

(51) Int. Cl.⁷ .................................................. B23C 1/00
(52) U.S. Cl. ....................... 409/132; 318/570; 409/80; 700/182; 700/191
(58) Field of Search ............... 409/79, 80, 132; 700/172, 182, 184, 186, 187, 190, 191; 318/568.1, 570, 579

(56) References Cited

U.S. PATENT DOCUMENTS

| | | | | |
|---|---|---|---|---|
| 3,641,872 A | * | 2/1972 | Ulfhielm | 409/80 |
| 4,445,182 A | * | 4/1984 | Morita et al. | 318/572 |
| 4,621,959 A | * | 11/1986 | Kishi et al. | 409/80 |
| 4,739,489 A | * | 4/1988 | Kishi et al. | 318/579 |
| 4,757,461 A | | 7/1988 | Stohr et al. | 364/518 |
| 4,949,270 A | * | 8/1990 | Shima et al. | 700/191 |
| 5,015,130 A | * | 5/1991 | Matsuura et al. | 409/80 |
| 5,363,308 A | * | 11/1994 | Guyder | 318/570 |
| 5,595,463 A | | 1/1997 | Takegahara et al. | 409/132 |
| 5,602,748 A | * | 2/1997 | Seki et al. | 318/570 |

FOREIGN PATENT DOCUMENTS

| | | | | |
|---|---|---|---|---|
| EP | 328750 A2 | * | 8/1989 | 409/80 |
| EP | 0 996 045 A2 | | 4/2000 | |
| JP | 125754 A | * | 6/1986 | 409/80 |
| JP | 20954 A | * | 1/1989 | 409/80 |
| JP | 36048 A | * | 2/1990 | 409/79 |

* cited by examiner

*Primary Examiner*—Daniel W. Howell
(74) *Attorney, Agent, or Firm*—Lahive & Cockfield, LLP

(57) ABSTRACT

A computer-implemented method and system is disclosed for controlling a cutting tool of a high speed cutting machine. The method and system provides an effective tool path for controlling a cutting machine under a constant rate of material removal in a high speed cutting machine in order to get away with the extreme cutting forces. The tool path also allows to better transfer the heat generated between the cutting tool and the workpiece through the chip. The method and system can be applied to any geometry of final shape of a workpiece.

28 Claims, 17 Drawing Sheets

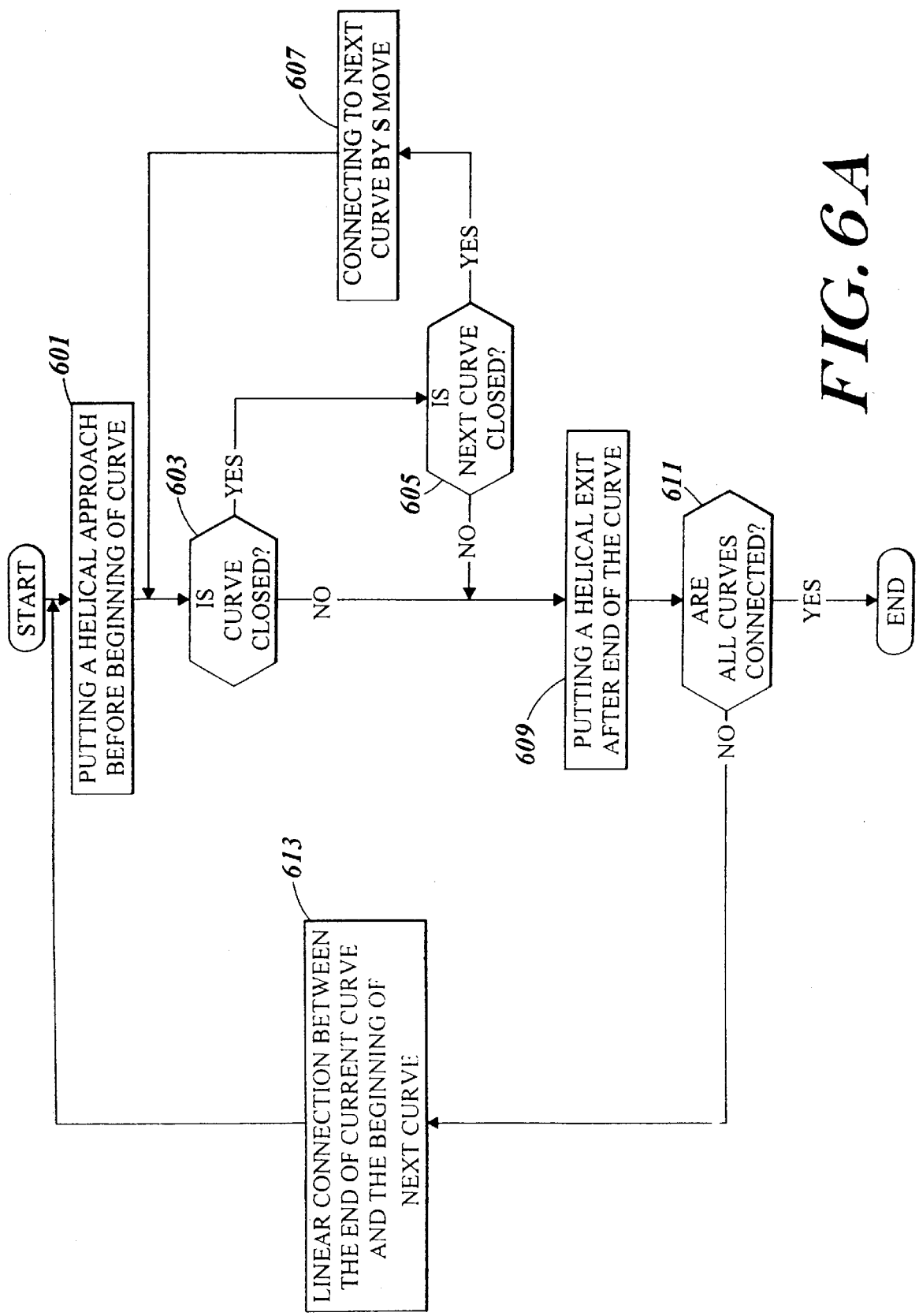

CONTROL FOR HIGH SPEED CUTTING TOOL

TECHNICAL FIELD

The present invention relates generally to controlling movement of a cutting tool in a high speed cutting machine and more particularly to a method and system for providing a tool path for the cutting tool of the high speed cutting machine.

BACKGROUND OF THE INVENTION

The recent advent of high speed cutting machines has opened up the possibility of machining a workpiece at a much faster rate than conventional machines allow. Because modem high speed cutting machines are capable of providing spinning rates upward of 40,000 rpm, even a small change of tool load on a cutting tool may damage the cutting tool or workpiece. In particular, in absence of sufficient dissipation of heat generated through the contact of the cutting tool with the workpiece, damage to the cutting tool (such as melting of the tool) or the workpiece is likely.

Many users of high speed cutting machines employ Computer Aided Manufacturing (CAM) systems for controlling the machines. Such CAM systems operate the cutting machines at much lower spinning rates than the capability of the machines, because conventional CAM systems are not suitable for ensuring the conditions for safe operation of the machines (such as constant tool load and efficient heat dissipation). As a result, the machines may not be operated at their full potential. Although some CAM systems provide limited support for roughing the workpiece, this limited support works only in connection with very few workpiece. These conventional roughing capabilities are of little use as the geometries of the workpiece become more complex.

SUMMARY OF THE INVENTION

The present invention provides a method and system for controlling movement of a cutting tool of a high speed cutting machine. More particularly, the present invention provides a tool path for the cutting tool spinning at a high rate with minimal risk of damage to the cutting tool and/or a workpiece. To avoid damaging the cutting tool and/or a workpiece, the present invention ensures that a constant tool load is maintained for the cutting tool as the tool travels along the cutting path. In addition, a constant removal rate of material from a workpiece is maintained so that extreme cutting forces are prevented from harming the cutting tool.

Another object of the present invention is to provide a method and system for controlling a cutting tool of a high speed cutting machine that leads to an efficient dissipation of heat generated through contact of the cutting tool with the workpiece. To achieve an efficient heat dissipation, the present invention provides a tool path along which the cutting tool travels to remove material from the workpiece with a constant chip size so as to enhance the transfer of the heat to chip.

In accordance with one aspect of the present invention, a computer-implemented method for machining selected portions of a workpiece by a cutting tool of a high speed cutting machine is provided. The workpiece is imaginarily divided into horizontal slices. The horizontal slice is a unit for the cutting tool to remove material from the workpiece at a time. One of the horizontal slices of the workpiece is selected. The boundary of the slice is determined and subsequent boundaries are determined by assuming material removal from the slice by a cutting depth of the cutting tool buried in the workpiece from the previous boundary. A tool path is generated based on the boundaries of the selected portions of the slice and the cutting tool path is positioned in the air from the boundaries depending on the radius of the cutting tool and a predetermined value of the cutting depth of the cutting tool. The selected portions are machined by moving the cutting tool along said generated tool path.

In accordance with another aspect of the present invention, a controller for controlling a cutting tool of a high speed cutting machine is provided. The controller includes a memory element and a processor. The memory element stores instructions for controlling the cutting tool and data regarding the workpiece for controlling the cutting tool. The processor executes the instructions stored in the memory element for controlling signals for a tool path of the cutting tool. The processor generates data for horizontal slice of the workpiece using the data regarding the workpiece stored in the memory. The processor examines the data for a slice of the workpiece to determine an initial boundary of the selected portion of the slice. The processor generates subsequent boundary data of the selected portions of the slice based on the initial boundary data. The subsequent boundary data may be determined by subtracting the cutting depth of the cutting tool buried in the workpiece from the previous boundary data. The processor generates signals for a tool path, where the tool path is positioned in the air remote from the boundaries depending on the radius of the cutting tool and a predetermined value of the cutting depth of the cutting tool.

The present invention implements a computerized cutting method and system to provide an accurate, efficient and robust tool path along which the cutting tool machines the workpiece under a constant tool load and a constant chip size. Furthermore, the present invention provides a cutting method and system for controlling a cutting tool that are applicable to any geometry of a final product, regardless of the complexity of geometry in a workpiece. The cutting method and system of the present invention are applicable even to a workpiece with no boundary that is open to the air and to any geometry of a workpiece, regardless of the number and location of areas of the workpiece that are not to be removed.

BRIEF DESCRIPTION OF THE DRAWINGS

An illustrative embodiment of the present invention will be described below relative to the following drawings.

FIG. 6A is a flow chart that shows steps performed to connect tool paths for a cutting tool to complete the cutting tool path of the cutting tool in FIG. 4.

DETAILED DESCRIPTION OF THE INVENTION

Figure 1:
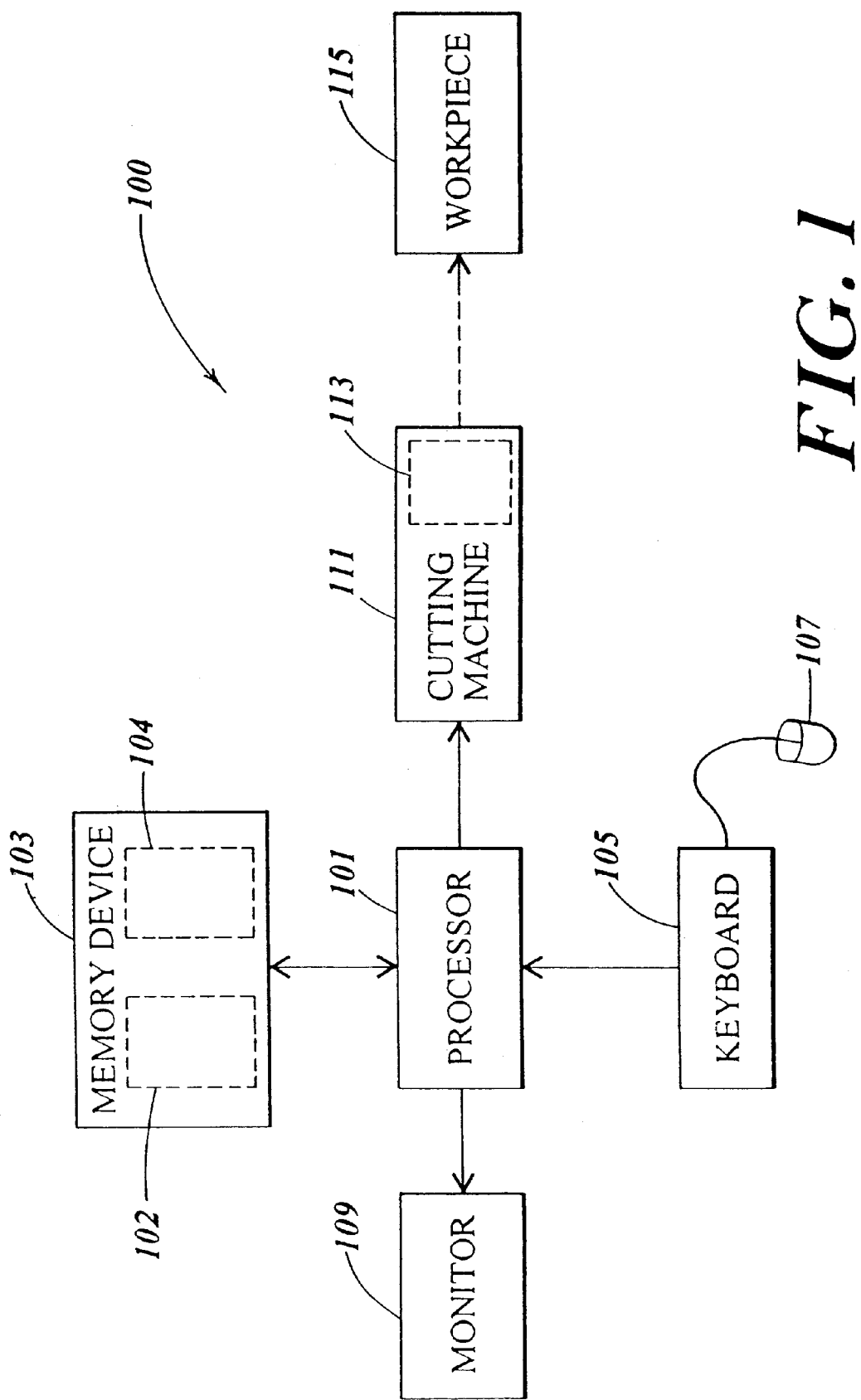
FIG. 1 is a block diagram of a computerized system in which the illustrative embodiment of present invention may be implemented.

The illustrative embodiment of the present invention concerns a computerized method and system that provide for the control of a cutting tool in a high speed cutting machine. In particular, the illustrative embodiment generates a tool path for a cutting tool to machine a workpiece based on the boundary of the workpiece that is open to the air. The cutting tool of the cutting machine approaches the boundary of the workpiece from the air and machines the workpiece traveling along the tool path generated by the computerized control system. When the workpiece does not have any boundary that is open to the air for the cutting tool to approach the workpiece, the cutting tool moves down to the workpiece to make an open area with an initial boundary that is open to the air.

The computerized control of the illustrative embodiment of the present invention provides a tool path for the cutting tool along which the cutting tool is continuously engaged in a workpiece. The cutting tool stays in the workpiece in the cases when a tool path is closed. The closed tool path is provided if a tool path terminates where it started. The cutting tool moves from the closed tool path to a next tool path while engaged in the workpiece.

The illustrative embodiment also provides a method and system for controlling a cutting tool to reduce repositioning motions so as to minimize the time when the cutting tool is retracted from the workpiece. In the case when a retraction of a cutting tool is necessary, the cutting tool moves up off the workpiece and then down to the workpiece. The cutting tool moves to next tool path without retraction when the tool path does not cause collision with an obstacle. If a collision is likely to happen, the cutting tool moves up to a height of clearance level above the top of the workpiece or to a minimum safest height.

The illustrative embodiment of the present invention provides a tool path for a cutting tool to minimize sudden tool direction changes. In connecting closed loop tool paths, the cutting tool moves to the next tool path using an "S" motion to reduce directional changes. In approaching and exiting tool paths, the cutting tool moves using a helical spline motion to minimize directional changes. In repositioning, the cutting tool moves off the surface using a smooth helical spline motion, and onto the surface for the next cut using a smooth helical spline motion as well.

In addition, the illustrative embodiment of the present invention generates a tool path for a cutting tool to machine a workpiece in a constant cutting condition. To keep the cutting tool in a constant cutting condition, the cutting tool remains along the tool path in a climb cutting condition. This constant cutting condition prevents any changes acting on the cutting tool which causes the cutting tool to break.

As a result, the illustrative embodiment of the present invention can implement a real time and computerized cutting method and system for controlling a cutting tool in a high speed cutting machine. The computerized cutting method and system provide an effective tool path for controlling a cutting machine under a constant rate of material removal in a high speed cutting machine in order to get away with the extreme cutting forces. The tool path also facilitates better transfer of heat to chip removed by the cutting tool. The illustrative embodiment of the present invention provides a tool path for a cutting tool that is applicable to any geometry of the workpiece.

FIG. 1 is a block diagram that illustrates an exemplary configuration of a computerized system that is suitable for practicing an illustrative embodiment of the present invention. The illustrative embodiment of the present invention is based on a computer aided manufacturing (CAM) system, which contains information concerning product that is to be manufactured by the system 100. The computerized system 100 of the illustrative embodiment of the present invention includes a processor 101, a memory device 103, input devices 105 and 107, an display device 109, and a high speed cutting machine 111. The high speed cutting machine 111 includes a cutting tool 113 for cutting a selected portion of a workpiece 115. The processor 101 controls the entire operation of the system 100 based on instructions stored in the memory device 103. Those of skill in the art will appreciate that the system 100 can be implemented on a tightly coupled system or a distributed system. Those of skill in the art will also appreciate that the processor 101 can be in a workstation integrated into the high speed cutting machine 111 or remotely located relative to the cutting machine 111. The memory device includes a main memory device 102, for example a random access memory (RAM), which stores program codes of instructions used to operate the system 100, and a secondary memory device 104, for example a hard disk memory, which stores program data used to operate the cutting system. The second memory device 104 also contains data for product to be manufactured and data for a workpiece. The system 100 may be work in conjunction with a Computer Aided Design (CAD) system such as Pro/ENGINEER™ and the data for a product to be manufactured may be transferred from the CAD system to the secondary memory 104. The input device including a keyboard 105 and a pointer 107 may be used for entering data for the workpiece and other command information for cutting the workpiece. The display device 109 including a CRT display or LCD display shows the user interface for inputting command and data and outputting the manufacturing status of the workpiece.

Figure 2:
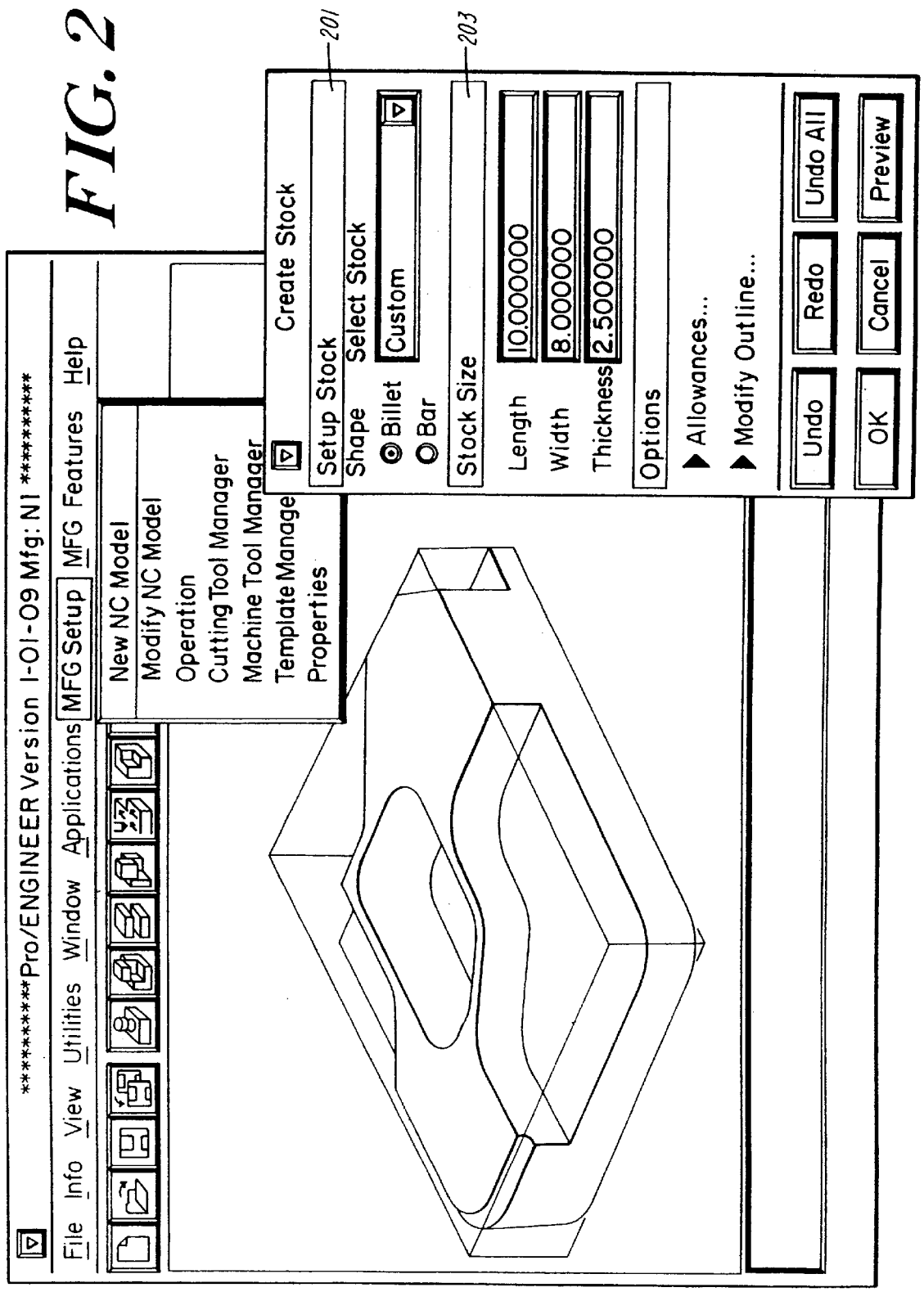
FIG. 2 is an example of a display that shows an option for a user to input data for a workpiece into the computerized system.

FIG. 2 is an example of a display that shows a user interface. The user interface displays resultant shape of a target product. The user interface also enables the user to enter data for a workpiece, such as shape and size of the workpiece. The user may input data for the shape of the workpiece, such as a billet or a bar, in a setup section 210 of the display. The user may also input the size of the workpiece including a length, a width and a thickness of the workpiece in a size section 203 of the display. The input data for the workpiece is stored in the memory device 103 and used for generating a tool path of a cutting tool to machine the workpiece in the illustrative embodiment of the present invention.

Figure 3:
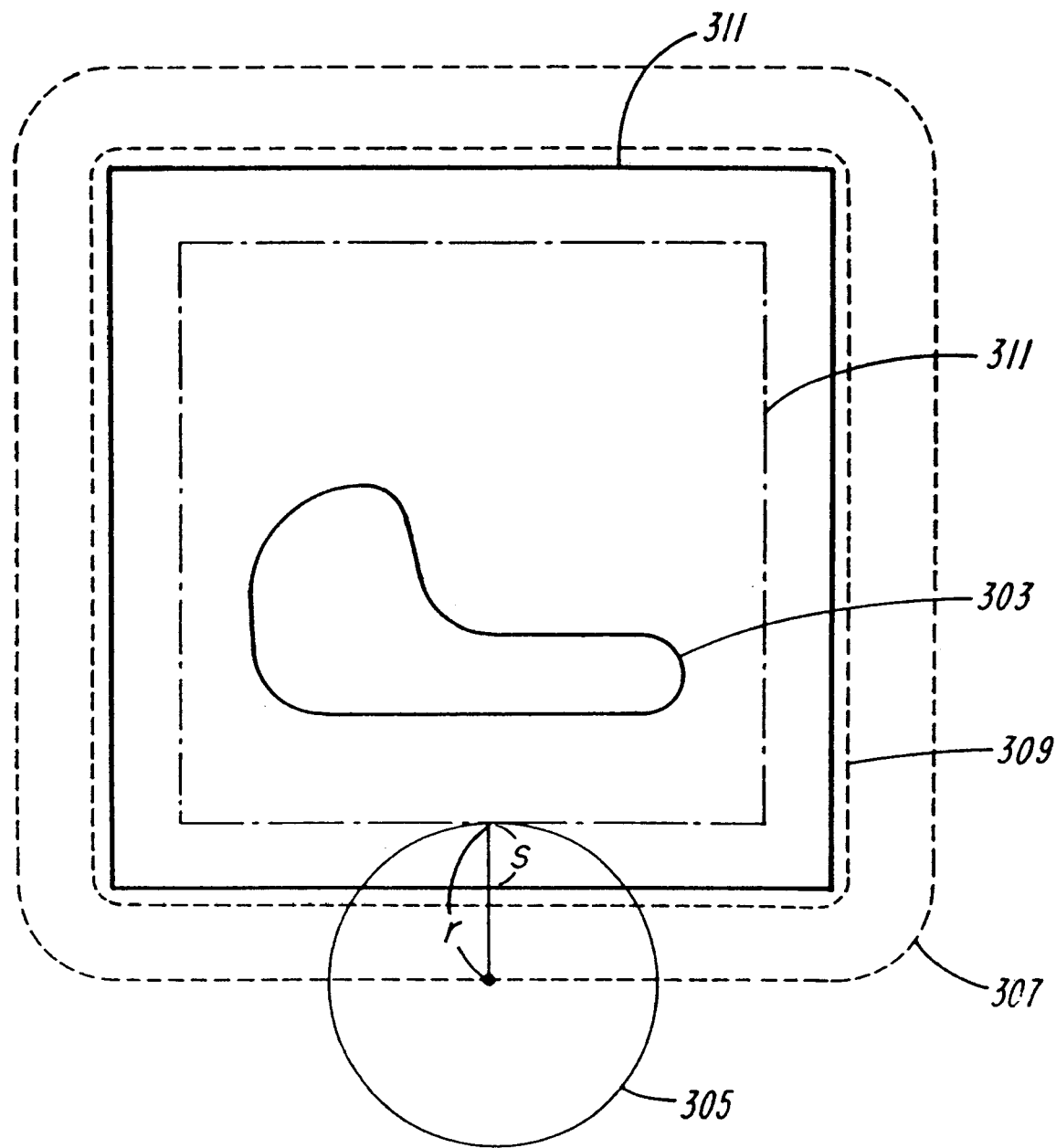
FIG. 3 is a top view of a workpiece and a cutting tool that illustrates the relationship between the workpiece and the cutting tool when the cutting tool is engaged in the workpiece to remove portions of the workpiece.

FIG. 3 is a top view of a workpiece and a cutting tool that illustrates the relationship between the workpiece and the cutting tool to define terms used in the description of the illustrative embodiment of the present invention. The workpiece is imaginarily divided into horizontal "slices" for the cutting tool 305 to rough out the workpiece in the illustrative embodiment of the present invention. The depth of a slice is determined by some factors, such as capabilities of the cutting tool and the material of the workpiece. A user may also define the depth of the slice as a specified constant value. When the cutting tool machines the slice, the cutting tool may touch the adjacent slice depending on the geometrical situation, but may not gouge the adjacent slice.

Each slice of the workpiece may include "a selected portion" to be cut out. Each slice of the workpiece may also include non-selected portion 303 that is not to be cut out. The non-selected portion 303 is called as "an island." Each slice of the workpiece may also include "boundaries" 301 and 311 that are open to the air for the cutting tool to approach the slice from the air. The initial boundary 301 of the slice enables the cutting tool to touch the workpiece from the air for the fist time.

The illustrative embodiment of the present invention employs a cutting tool 305 with a radius r. The cutting tool 305 removes material from the workpiece by a "step-over" value s based on a horizontal slice of the workpiece. The step-over value s is a length of the cutting tool that is buried into the work material. The step-over value depends on the material of the workpiece and machine capabilities. The step-over value may also be defined as a specified constant value by a user.

A tool path is defined as the contour of the cutting tool center. If a tool path 307 is determined based on the initial boundary 301, the cutting tool 305 travels along the tool path 307 to cut the selected portion of the slice. If the cutting tool 305 cut the workpiece by a step-over value s that is less than the radius r of the cutting tool, the tool path 307 is located apart from the initial boundary 301 of the workpiece to the air by a value r-s as shown in FIG. 3. Assuming that the cutting tool 305 machines the workpiece along the tool path 307, the subsequent boundary 311 of the slice is generated inside of the initial boundary 301 of the slice. The subsequent tool path 309 may be determined based on the subsequent boundary 311.

Figure 4:
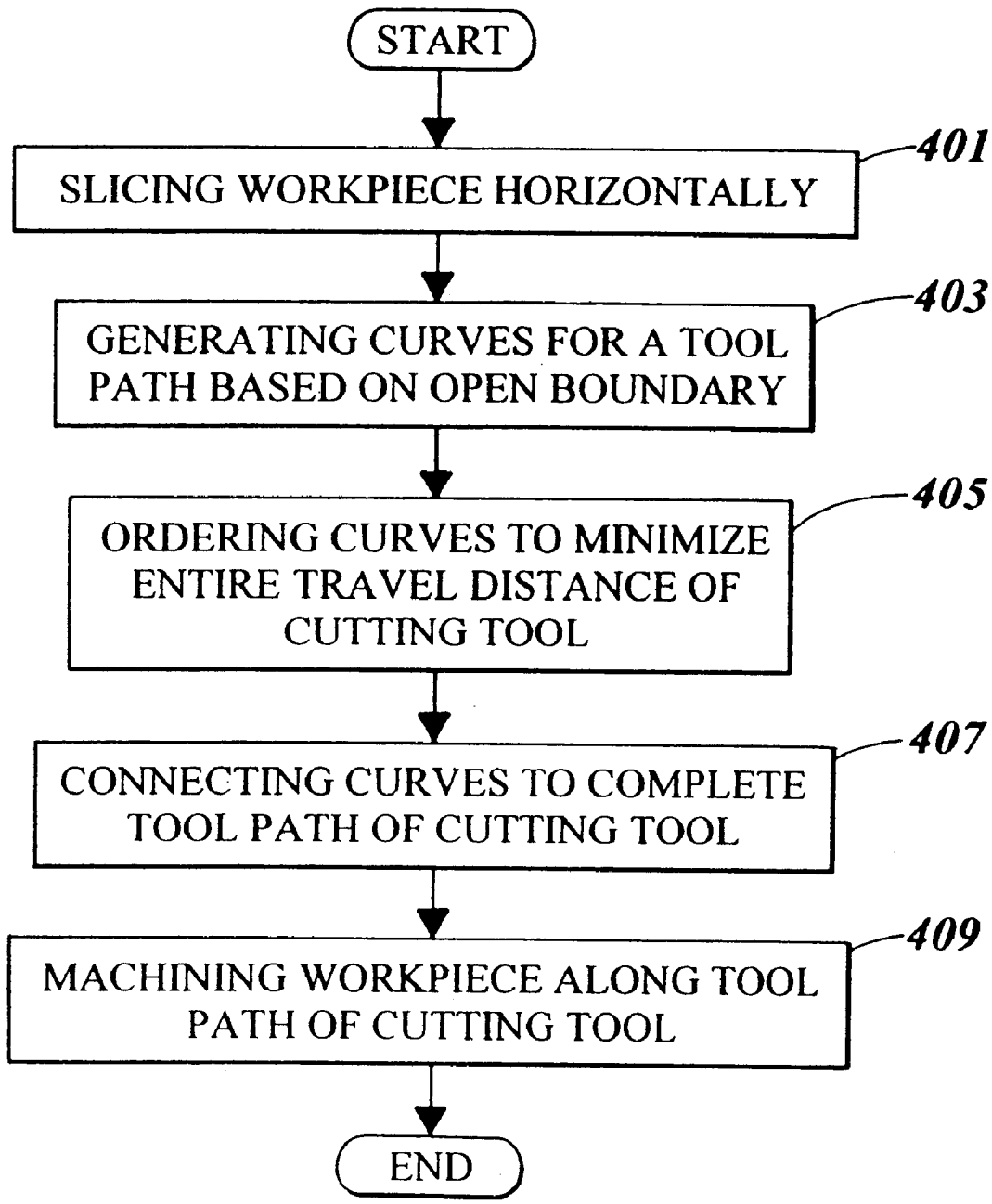
FIG. 4 is a flow chart that illustrates the steps for providing a tool path for a cutting tool to machine a workpiece in the illustrative embodiment of the present invention.

FIG. 4 is a flow chart that shows steps performed in the illustrative embodiment of present invention. In the chart, a workpiece is horizontally divided into imaginary slices depending on the predetermined depth (step 401). A cutting tool in a high speed cutting machine operates based on a horizontal slice of the workpiece. The cutting tool removes material from the workpiece by at most a step-over value from the boundary of the slice, which keeps tool load under a maximum limit. The cutting tool is buried in the slice horizontally by a step-over value and vertically by the depth of a slice. This enables the tool load to be kept constant because the tool load is determined by cross-sectional depth of the cutting tool that is buried into the workpiece as it cuts the workpiece forward.

Selected portions of the slice are machined by the cutting tool from the boundary of the slice. The tool path of the slice is generated based on the boundary of the non-machined area of a slice. The tool path for the cutting tool is generated by offsetting towards the air the boundary of the non-machined area of a workpiece by a tool radius value minus the step-over value (step 403). The generated tool paths are stored in the memory device 102 of the system 100. Where no initial boundary that is open to the air can be found, an additional step is required to open up an area with a boundary that is open to the air. This is described below in more detail.

Once a tool path is determined, next tool path is generated based on a new boundary of the workpiece created by removing material from the slice by a step-over value. This process is iterated until all selected portions of the slice are removed.

The tool paths generated based on the boundaries are ordered to minimize connection distance of entire tool paths (step 405). The illustrative embodiment of the present invention employs some sensible ordering algorithm to determine a final order of tool paths to minimize the overall connection lengths.

The ordered tool paths are connected with consecutive tool paths to complete the entire tool path for the cutting tool (step 407). The illustrative embodiment of the present invention provides connecting paths to accomplish effective connections. The tool paths for a cutting tool may be a closed loop or an open loop. If consecutive tool paths are closed loops, the current tool path is connected to the next tool path by an "S" connecting path. If current tool path is an open loop, the cutting tool approaches and exits the tool path in a helical spline manner. The illustrative embodiment of the present invention also provides a path for retracting the cutting tool to a safe level when there is collision with an obstacle.

Once the entire tool path is complete, the workpiece is machined by the cutting tool along the generated tool path (step 409).

Figure 5:
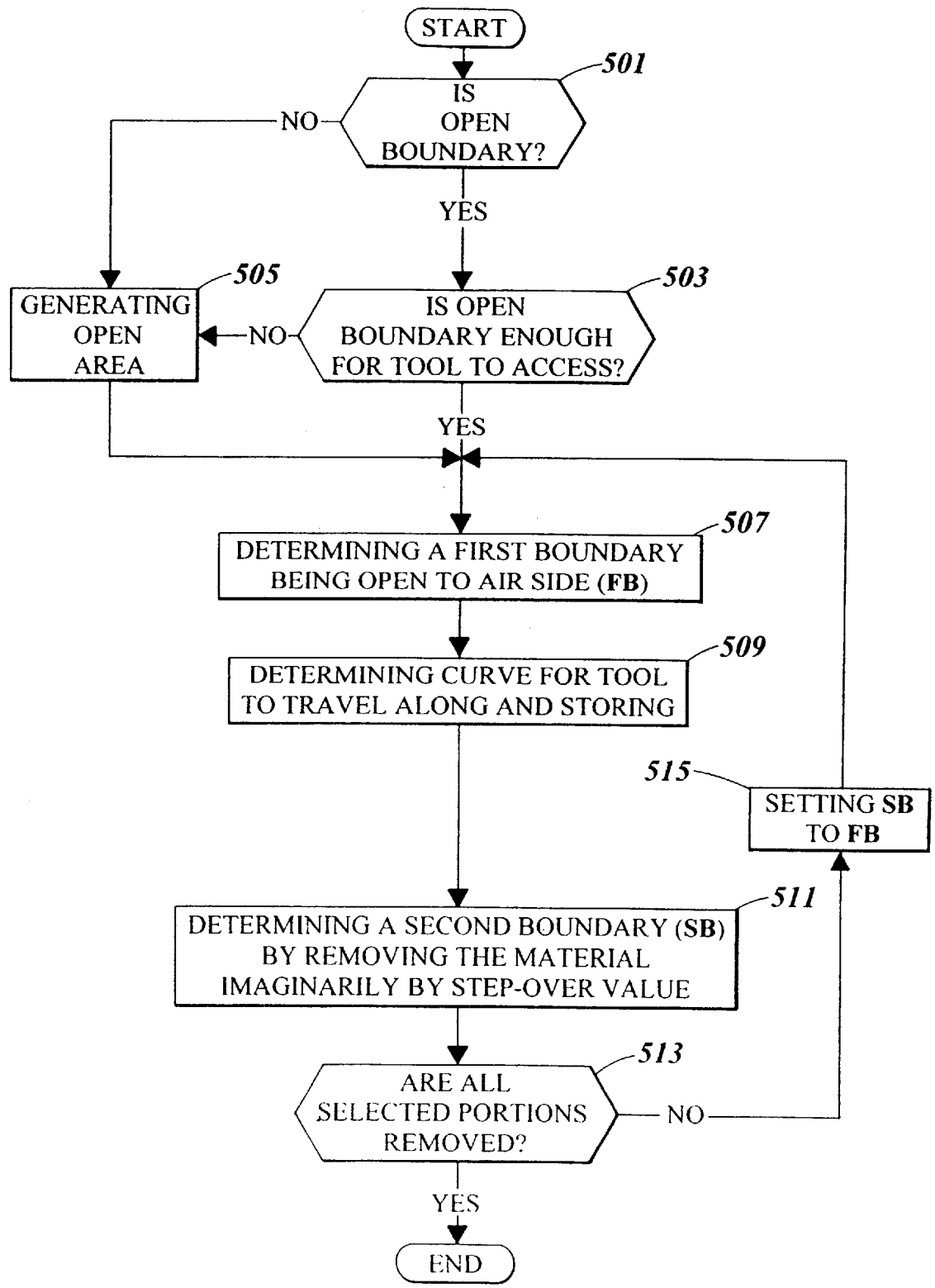
FIG. 5 is a flow chart that shows steps performed to generate tool paths for a cutting tool based on the boundary of a workpiece in FIG. 4.

FIG. 5 is a flow chart which shows steps performed in the step of generating tool paths in the illustrative embodiment of the present invention depicted in FIG. 4. If a slice of a workpiece is given, it is examined to determine whether there is an initial boundary (301 in FIG. 3) in the slice that is open to the air for the cutting tool to access the selected portion of the slice (step 501). If the there is an initial boundary, the boundary is examined to determine whether it is enough for the cutting tool to access the workpiece (step 503). If there is no initial boundary that is open to the air or the initial boundary is too small for the cutting tool to access the workpiece, the cutting tool generates an inner hole for an open area with an initial boundary that is open to the air (step 505). The boundary of the created hole may be used as an initial boundary for generating a tool path. The illustrative embodiment of generating a hole is described below in more detail.

Where the initial boundary of the slice is determined as a boundary of the slice for the cutting tool to access the workpiece (step 507), a tool path is generated based on the initial boundary (step 509). Assuming that the cutting tool has a cross-sectional view of a circle with radius r and the step-over value is s, the tool path is determined by moving the initial boundary to the air by r-s. The comers of the tool path are additionally rounded. The generated tool path is stored in the memory element of the system 100. Assuming that the cutting tool removes material from the selected portion of the slice by the step-over value s while traveling along the tool path, the subsequent boundary may be generated by moving the newly created tool path to the workpiece by the radius of the cutting tool (step 511). The subsequent boundaries are stored in the memory element 102 of the system 100.

Another example to implement the step for determining a tool path and the subsequent boundary is to assume that the cutting tool travels along the initial boundary. When the cutting tool travels along the initial boundary, an area (A) is generated that is removed from the slice of the workpiece by the cutting tool with a radius r. The removed area is moved to the air by a value r-s. The outer boundary of the area (A) that is moved to the air corresponds to the initial tool path (step 509) and the inner boundary of the area (A) corresponds to the subsequent boundary (step 511).

The above step of determining the tool paths based on the initial boundary of the slice is iterated until the selected portion of the slice is removed (step 513). In iteration, the subsequent boundary is set to the initial boundary (step 515).

Figure 6B:
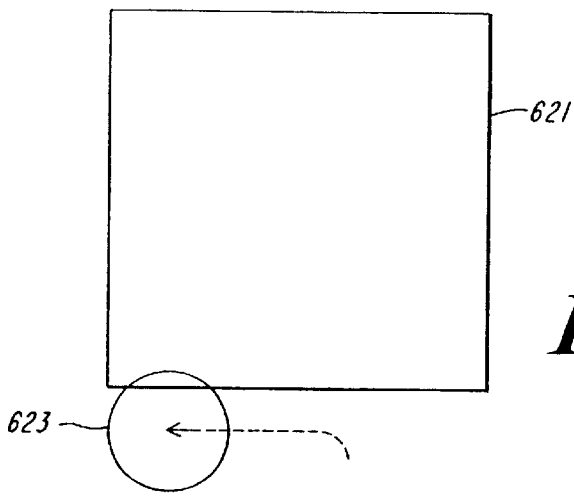
FIGS. 6B, 6C, and 6D are top views of a workpiece with a cutting tool that illustrate connecting paths of a cutting tool described in FIG. 6A.

If tool paths are generated based on boundaries of a slice, the tool paths are ordered to minimize the entire travel distance of the cutting tool as described above. After determining the order of tool paths, tool paths are connected with the consecutive tool paths. FIG. 6A shows detailed steps performed to connect tool paths in the illustrative embodiment of the present invention. If an initial tool path is given, a helical spline approach is set before the beginning point of the tool path (step 601). FIG. 6B is a top view of a workpiece and a cutting tool that shows the helical spline approach to the slice of a workpiece. In a given slice 621 of a workpiece, the cutting tool 623 may approach the slice 621 from an initial boundary of the workpiece by a helical spline manner. As shown in FIG. 6B, the helical spline approach looks like a 90 degree circular approach. The helical spline approach is tangent to both the cutting direction of the cutting tool 623 as well as the approaching direction of the cutting tool 623 from the air. The end position of the helical spline approach is a position where the cutting tool 623 is located inside the slice 621 of a workpiece by a step-over value and the cutting 623 tool is ready to start cutting.

Figure 6C:
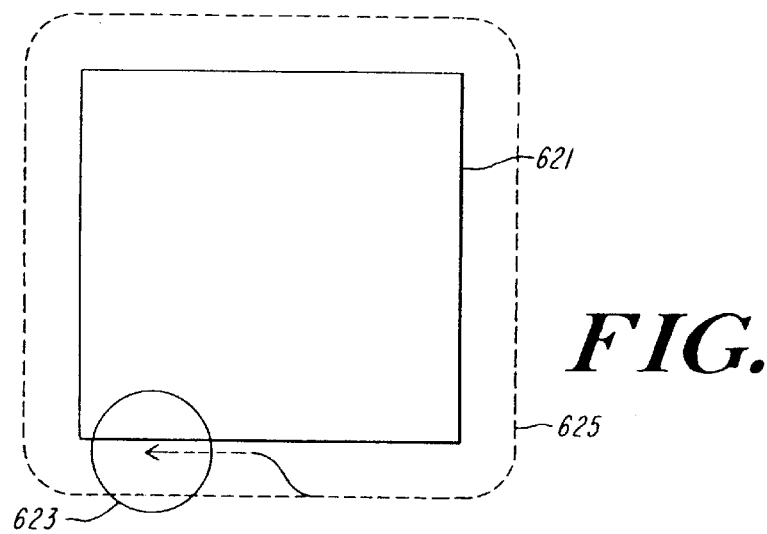

If a tool path is a closed loop (step 603) and a next tool path is also a closed loop (step 605), the tool path is connected to the next tool path by an S connection (step 607). If the consecutive tool paths are closed loops, the tool paths are connected by S connections. FIG. 6C is a top view of a workpiece and a cutting tool that shows an S connection between consecutive tool paths. A tool path 625 of a closed loop is connected to the next path that is also a closed loop by an S connecting motion. The S connecting motion enables a cutting tool 623 to be continuously engaged in the slice 621 of a workpiece along a tool path. The S connecting motion also minimize sudden tool direction changes that may lead to big damages to the cutting tool and/or the workpiece.

Figure 6D:
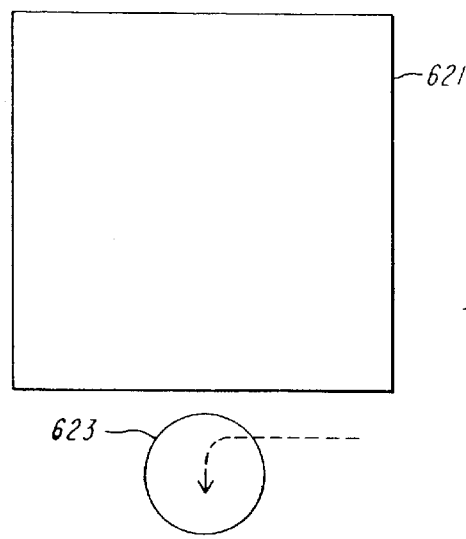

If the tool path is an open loop (step 603), a helical spline exit motion is put after the end of the tool path (step 607). FIG. 6D is a top view of a workpiece and a cutting tool that shows the helical spline exit motion from a tool path of the slice. The helical spline exit motion is similar to the helical spline approach motion but the cutting tool moves in the reverse direction. The helical spline exit also is tangent to both the cutting direction of the cutting tool as well as the exiting direction of the cutting tool to the air. The exit motion looks like a 90 degree circular move.

The above mentioned steps are repeated until all of the tool paths are connected with consecutive tool paths (step 611). In repetition, the cutting tool moves from the end of the current tool path to the beginning of the next tool path by a linear motion (step 613). The linear motion minimize the connection distances between tool paths.

The illustrative embodiment of the present invention connects between tool paths without retracting the cutting tool. If the tool path causes collision with an obstacle, the cutting tool is moved up to a height of a clearance level above the top of the workpiece, or to the minimum safest height where there is no collision with an obstacle. The cutting tool keeps connecting to next tool path by linear tool motions.

Figure 7:
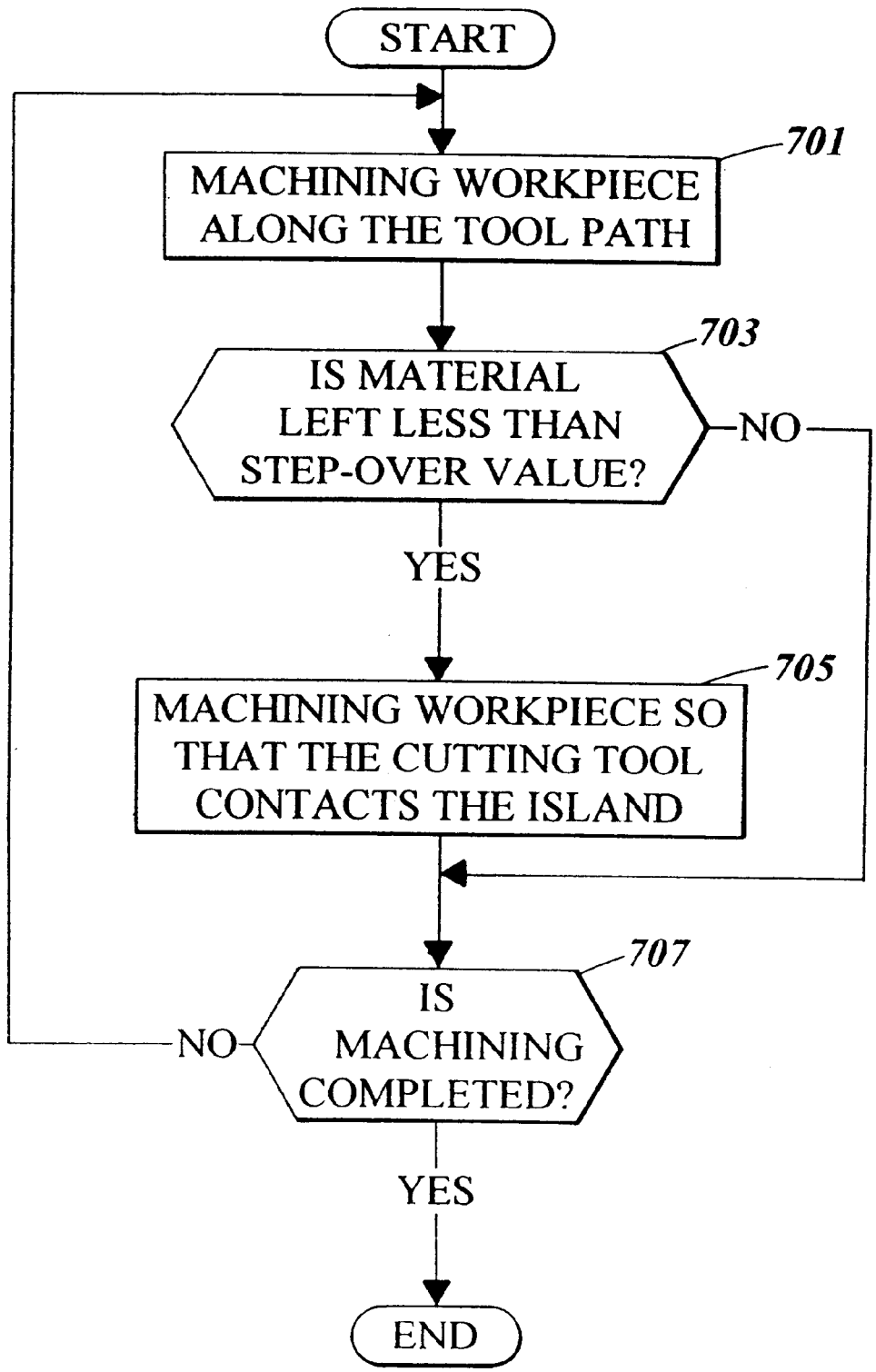
FIG. 7 is a flow chart that shows steps performed to machine a workpiece along tool paths for a cutting tool in FIG. 4.

FIG. 7 is a flow chart that shows steps performed to machine a workpiece along tool paths for a cutting tool in FIG. 4. When the connection is accomplished, the cutting tool then machines the workpiece long the tool paths (step 701). If a cutting tool encounters an island, it may happen that the material to be removed along a tool path is less than the step-over value. If there is less material left between the boundaries of the slice and the island (step 703), the cutting tool traverses along the boundary of the island until the step-over value is reached (step 705). The cutting tool continues to machine the workpiece along the tool path until it completes the curve. If during the machining of the loop, the cutting tool encounters a section of an island, the cutting tool then follows the boundary of the island as long as it does not exceed the amount of material specified with the step over value. This process continues until the boundary is completely machined. When this is accomplished the cutting tool then exits the workpiece (the slice), using a helical spline exit motion.

Figure 8A:
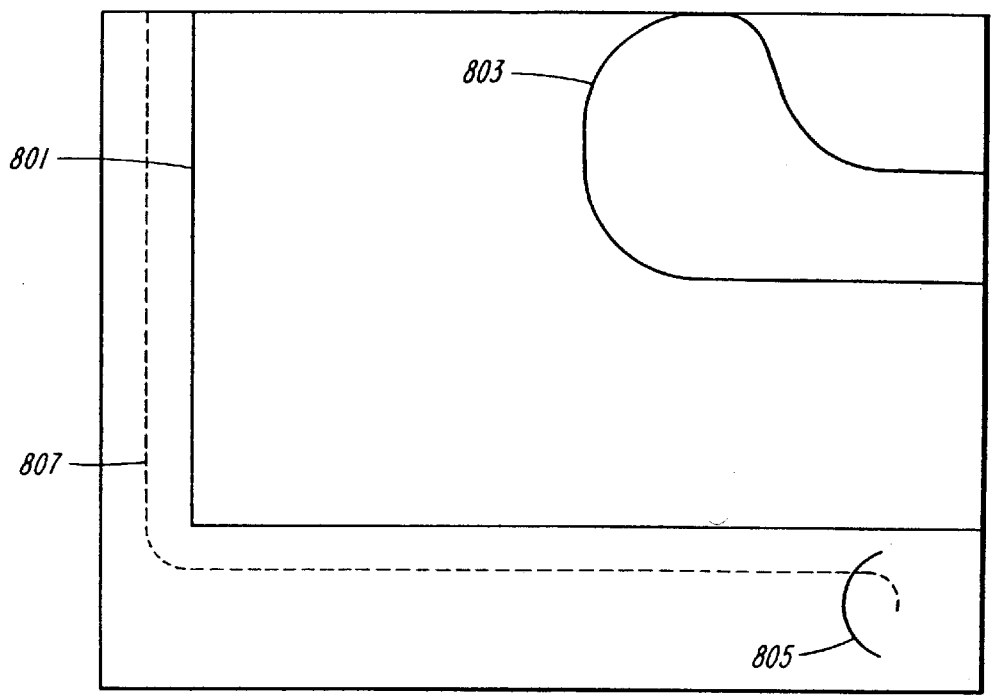
FIGS. 8A, 8B, 8C, 8D, 8E, 8F, 8G, and 8H are top views of a workpiece with a cutting tool that illustrate details of cutting a workpiece with an island that is not to be removed.
Figure 8B:
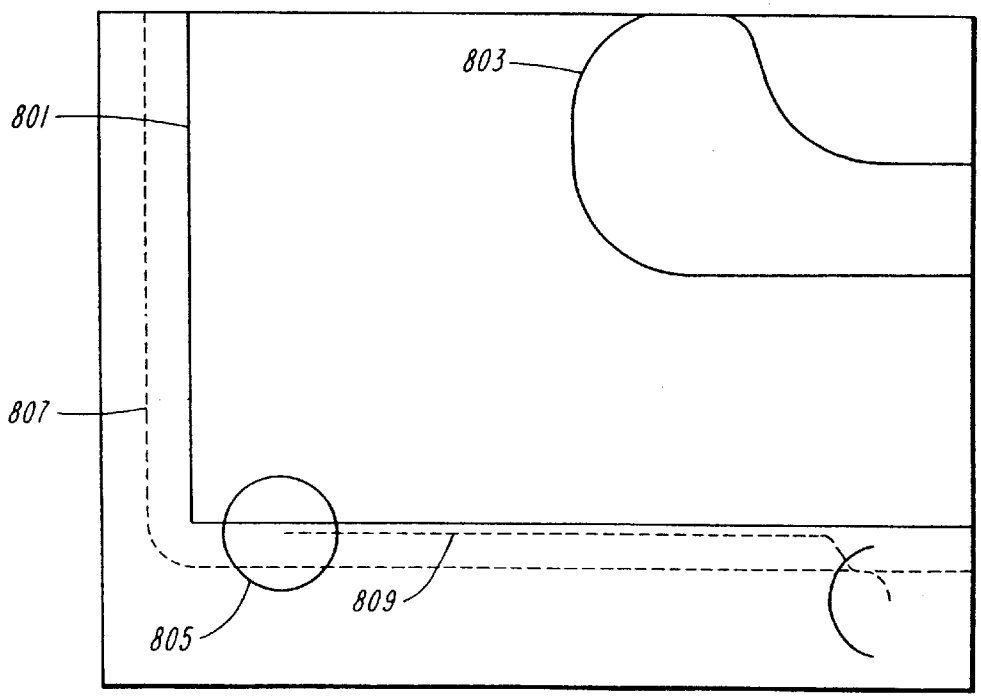

FIGS. 8A–8H show an illustrative embodiment of the present invention for machining a workpiece 801 including an island 803 (unselected portion of a workpiece not to be cut). The cutting tool 805 approaches the slice of a workpiece 801 in a helical spline manner described above and cut the workpiece by traveling along the tool path 807 as shown in FIG. 8A. After traveling along the tool path 807, the cutting tool 805 moves to a second tool path by an S connecting motion as described above. On the first "S" connecting motion, the cutting tool 805 completes the tool path 807 before making an "S" connecting motion into the next tool path 809 as shown in FIG. 8B.

Figure 8C:
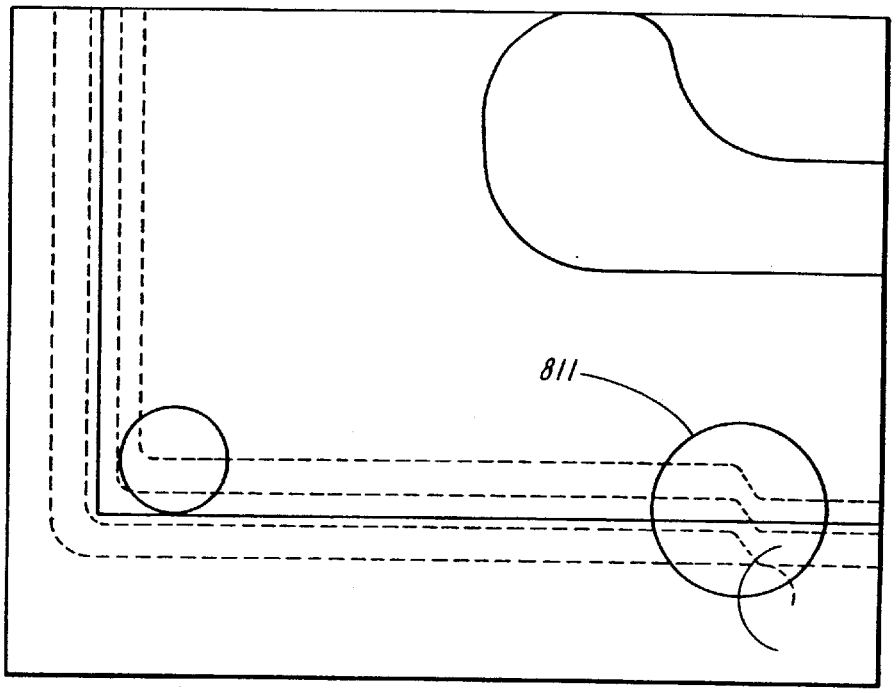

This insures that all the material is removed from the workpiece along the tool path. For all subsequent S connections 811, the cutting tool does not completely close the tool path as shown in FIG. 8C, and connects to the next tool path by using the same rate of material removal.

Figure 8D:
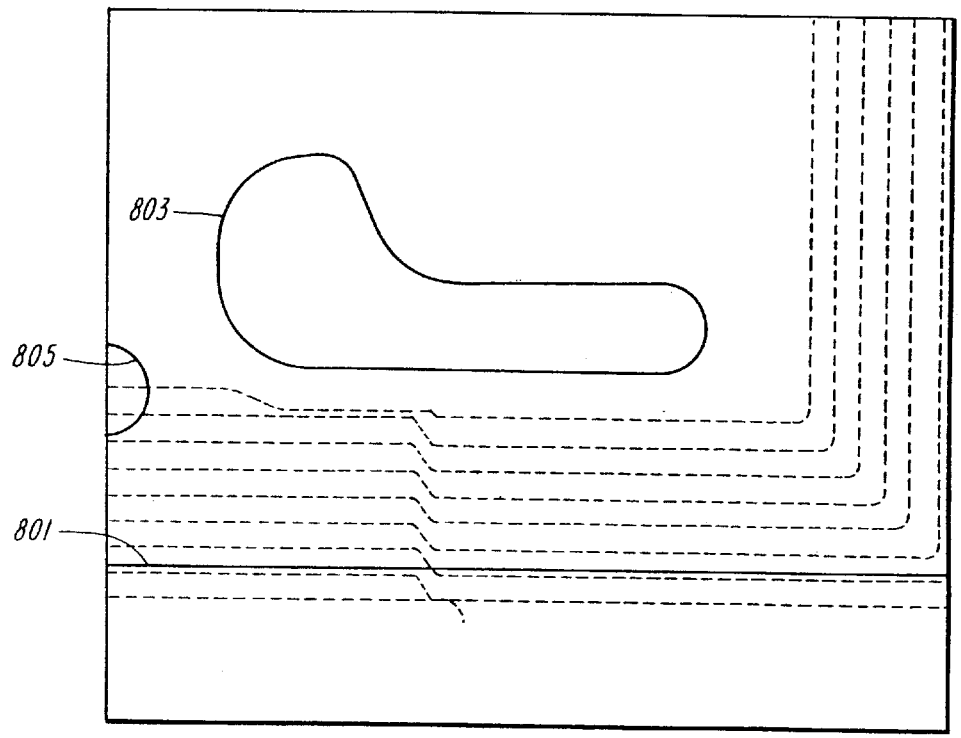
Figure 8E:
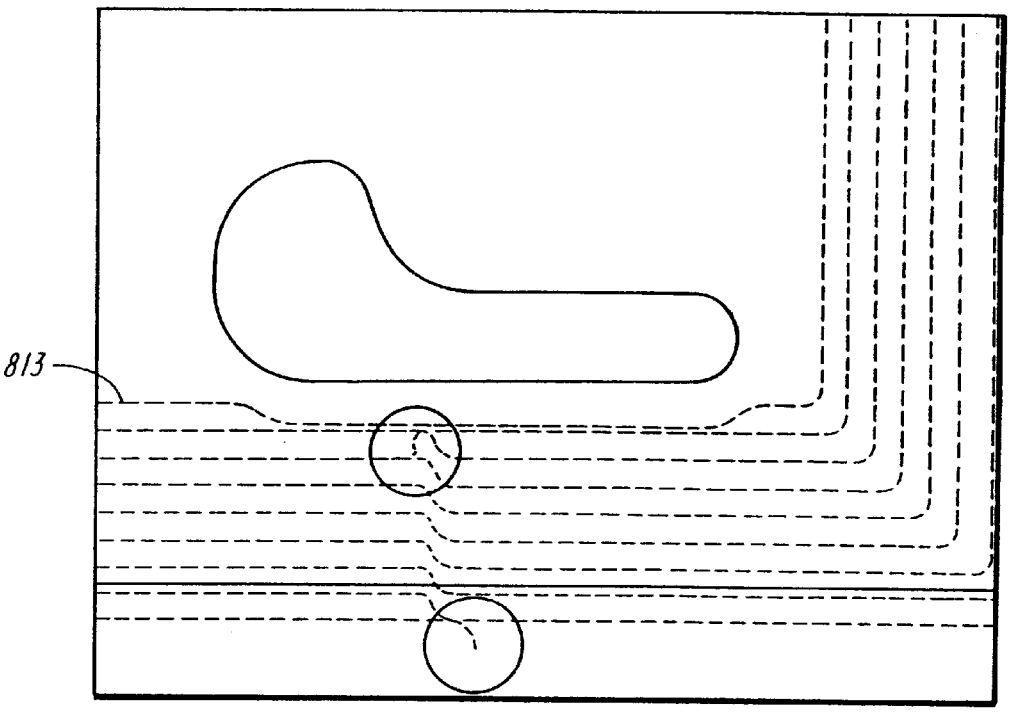

FIGS. 8D and 8E are examples of cutting the workpiece where the material to be removed along a closed loop of a tool path is less than the step-over value. In the example, there is less material left between the new boundary and the island than a step-over value. The cutting tool 805 traverses along the boundary of the island until the step-over value is reached. The cutting tool 805 follows the boundary of the island as long as it does not exceed the amount of material specified with the step over value. The cutting tool 805 continues to machine the workpiece along the tool path 813 of a closed loop until the cutting tool 805 completes the loop 813. When the tool path 813 is completed, the cutting tool 805 exits the slice of the workpiece using a helical spline exit motion.

Figure 8F:
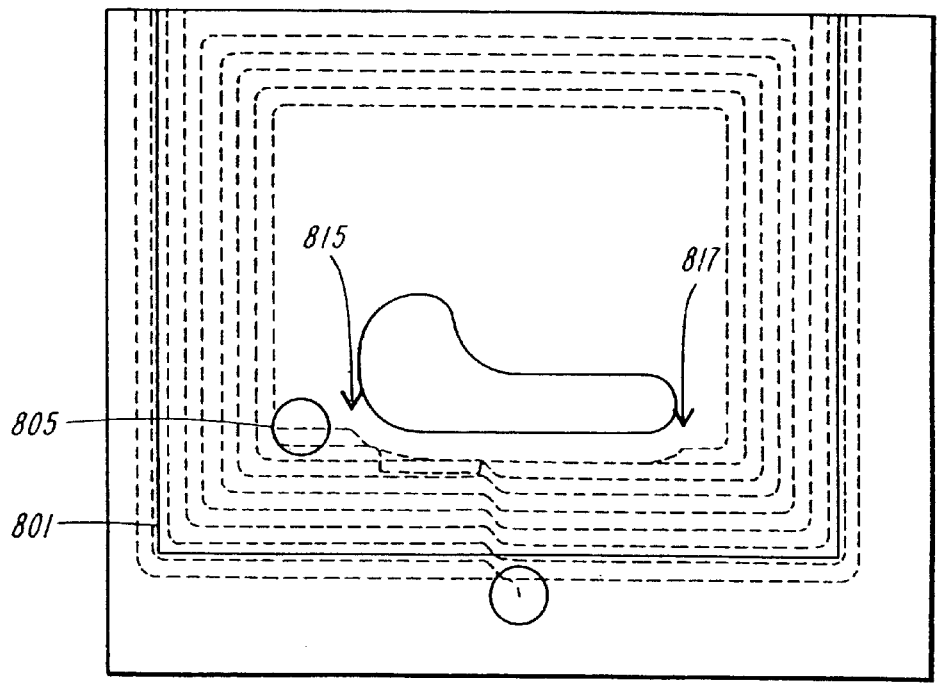
Figure 8G:
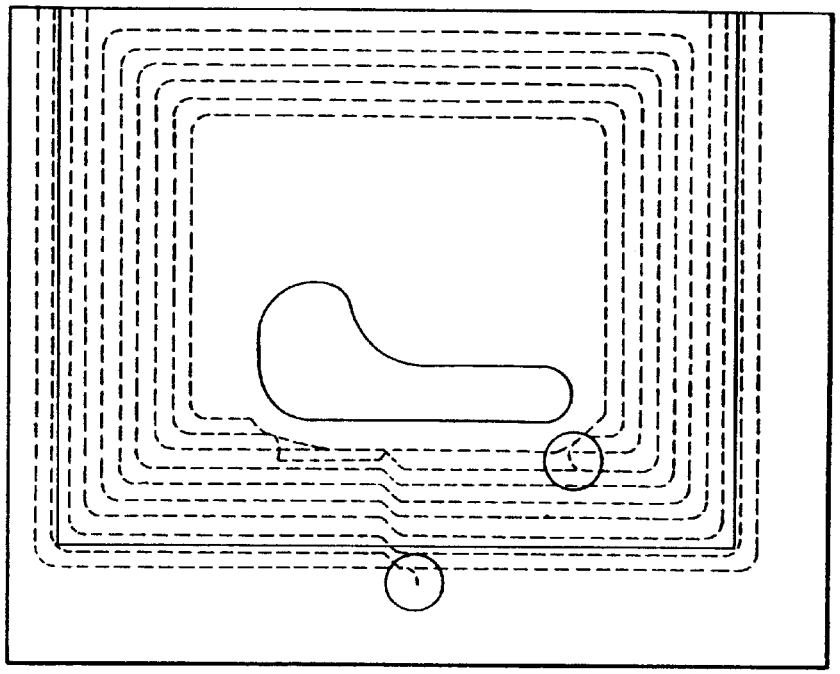
Figure 8H:
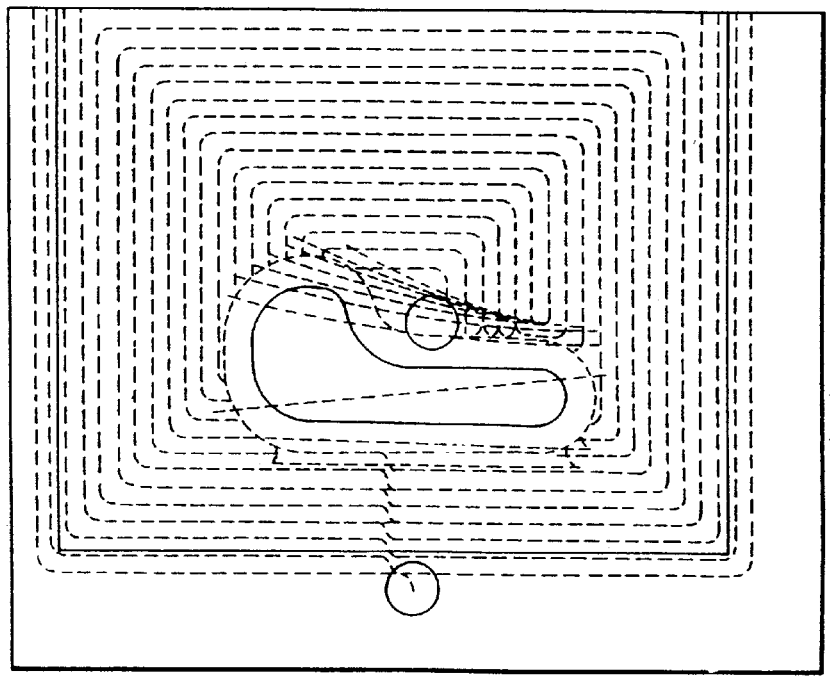

FIGS. 8F–8H show top views of examples of cutting along open loop tool paths the workpiece that has an island. The cutting tool 805 use the helical spline approach to enter a beginning position 815 of each open loop tool path, and cuts the workpiece in climb machining fashion until the end position 817 of the tool path. The cutting tool 805 exits the workpiece 801 using the helical spline exit motions. This process continues until all of the workpiece is machined, following the same procedure described above. After finishing machining the workpiece along each tool path, the cutting tool exits the workpiece using the helical spline exit motions. The cutting tool connects in a linear motion to a beginning position of next curve where the helical spline approach needs to start. The connection is accomplished at a safe height. This process continues until no material is left on the slice.

Figure 9A:
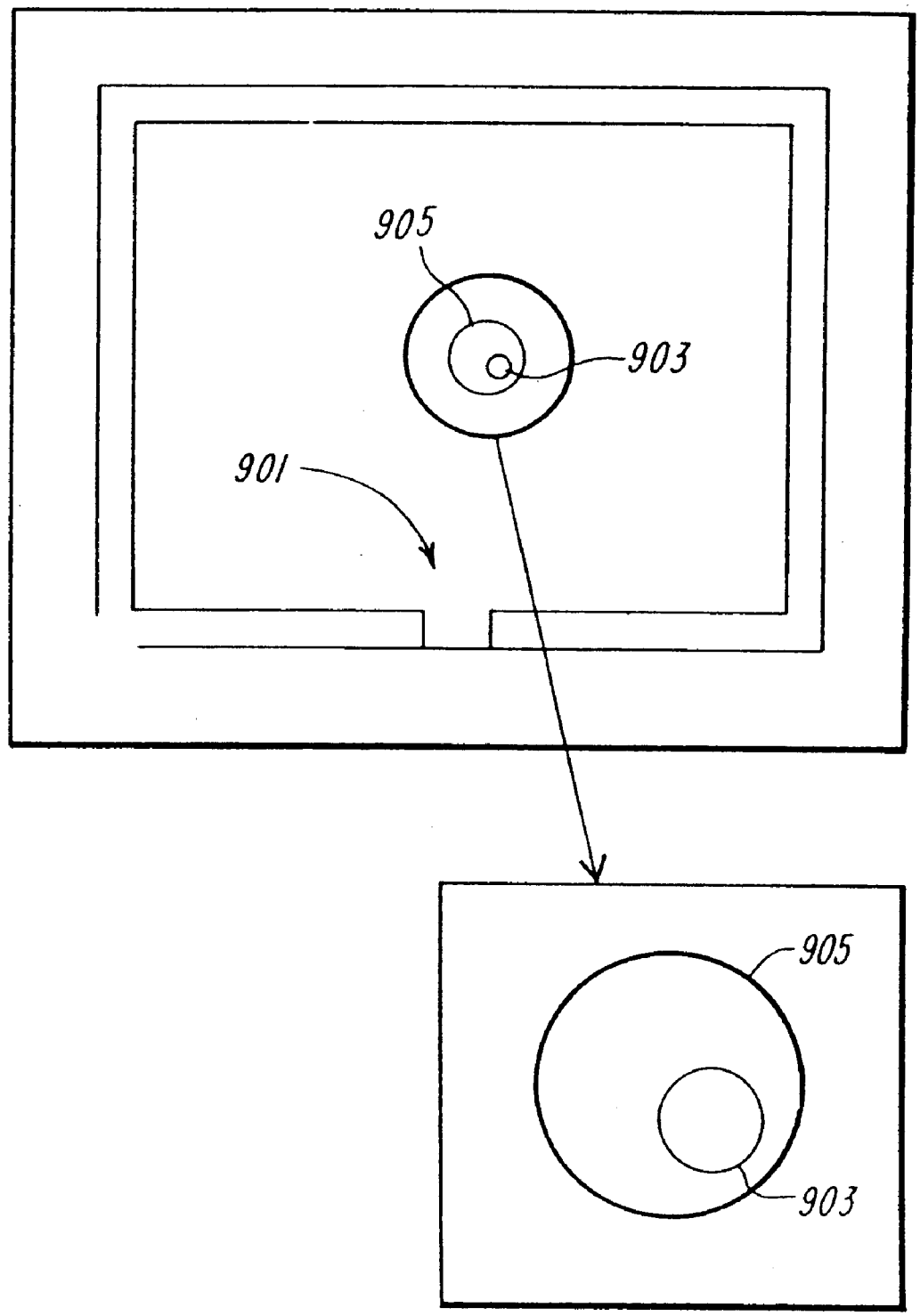
FIGS. 9A, 9B, 9C, 9D, 9E, 9F, and 9G are top views of a workpiece with a cutting tool that illustrate details of cutting a workpiece with no boundary for the cutting tool to access the workpiece.

FIGS. 9A–9G shows examples of cutting a slice of a workpiece that has no boundary that is open enough for the cutting tool to access the slice. If a slice of a workpiece does not have an initial boundary that is open to the air, the cutting tool generates an area that is open to the air for the cutting tool to approach the slice. If the slice has an initial boundary 901 that is small for the cutting tool 905 to access the workpiece, the cutting tool 905 also generates an area 903 that is open for the cutting tool 905 to approach the slice as shown in FIG. 9A.

In order for the cutting tool to generate an area that is open to the air for the cutting tool 905 to approach the slice, the cutting tool 905 moves down to the slice in a helical spline manner until the depth of the slice is reached. From the top view as shown in FIG. 9A, the angular displacement of the helical motion is a minimum of 360 degrees. Those of skill in the art will appreciate that the angular displacement of the helical motion may be more than 360 degrees if the specified ramp angle of the cutting tool motion requires more revolutions. The helical spline motion is tangent to the approaching direction of the cutting tool from the clearance position. The helical spline motion is tangent to the cutting direction of the cutting tool. This is similar to helical spline approaches described above for approaching the slice of a workpiece, but the total angular displacement is not 90 degrees.

Those of skill in the art will appreciate that if an open area is generated, the same steps described in FIGS. 4–7 are applicable to the case where no boundary that is open to the air can be found, because the control of the cutting tool in the illustrative embodiment of the present invention is applicable regardless of the complexity of the boundaries and the number and location of islands.

Figure 9B:
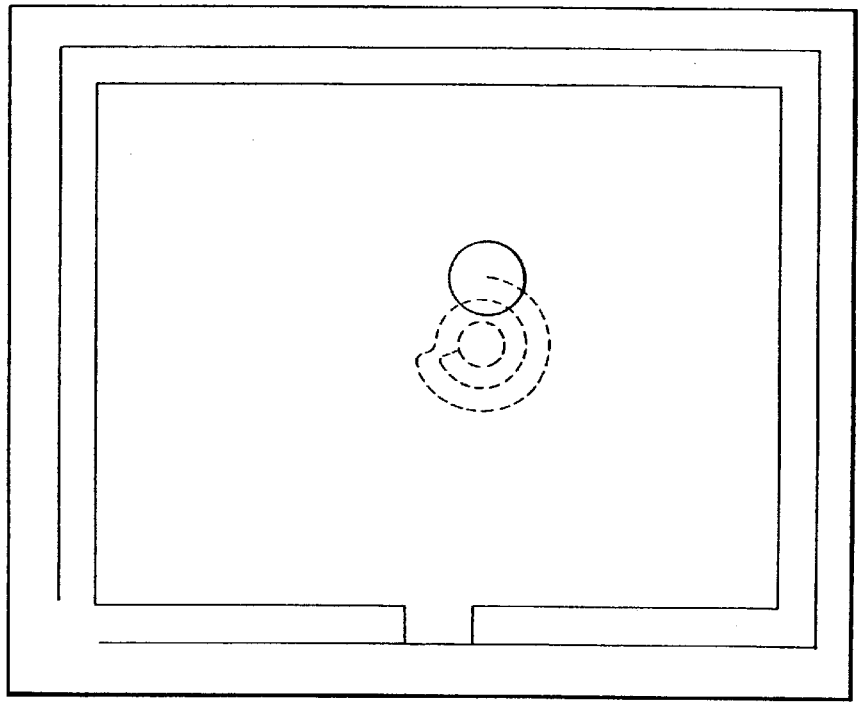

After the cutting tool has approached the workpiece using the helical spline approach, the open area which the cutting tool has generated is considered as an initial boundary. Apparently, the generated open area forms a closed loop. The tool path is generated based on the boundary that is open to the air. If the next tool path also forms a closed loop, the cutting tool then connects to the next tool path using an S connecting motion as shown in FIG. 9B. On the first S connecting motion, the cutting tool totally completes the first closed loop tool path before making an S connecting motion into the next tool path. This insure that all the material of the workpiece is removed along the tool path. For all subsequent S connecting motions, the cutting tool does not completely close the loop, and connects to the next tool path using the same rate of material removal.

Figure 9C:
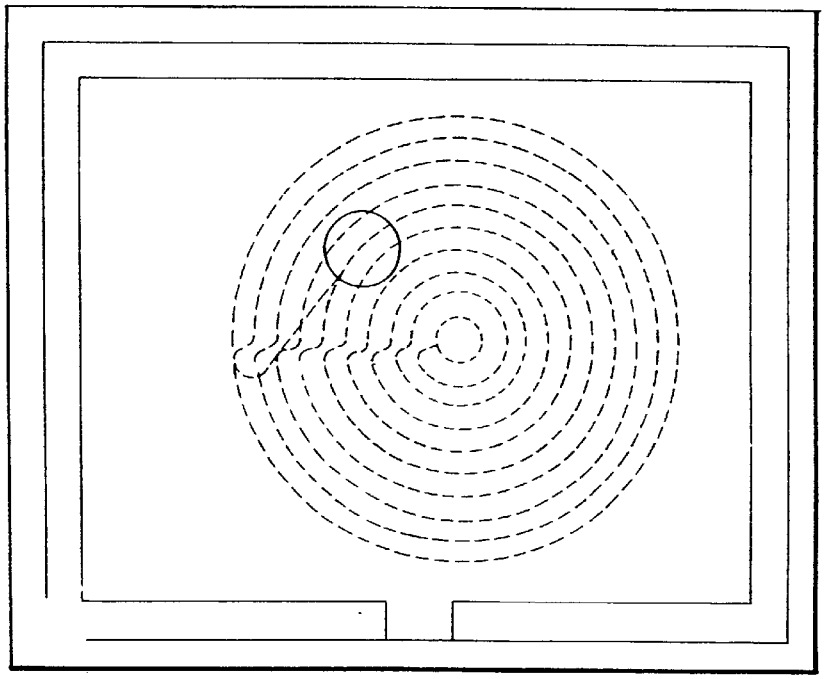

The process continues until all closed loop tool path are completed as shown in FIG. 9C. The cutting tool exits the workpiece using a helical spline exit motion in a same manner as described above. The boundary of the workpiece remained is no longer a closed loop. It becomes an open boundary. The cutting tool will then use the helical spline approach to enter each open boundary, and cuts the material in climb machining fashion until the end position of the curve where the cutting tool exits the workpiece using the helical spline exit motions.

Figure 9D:
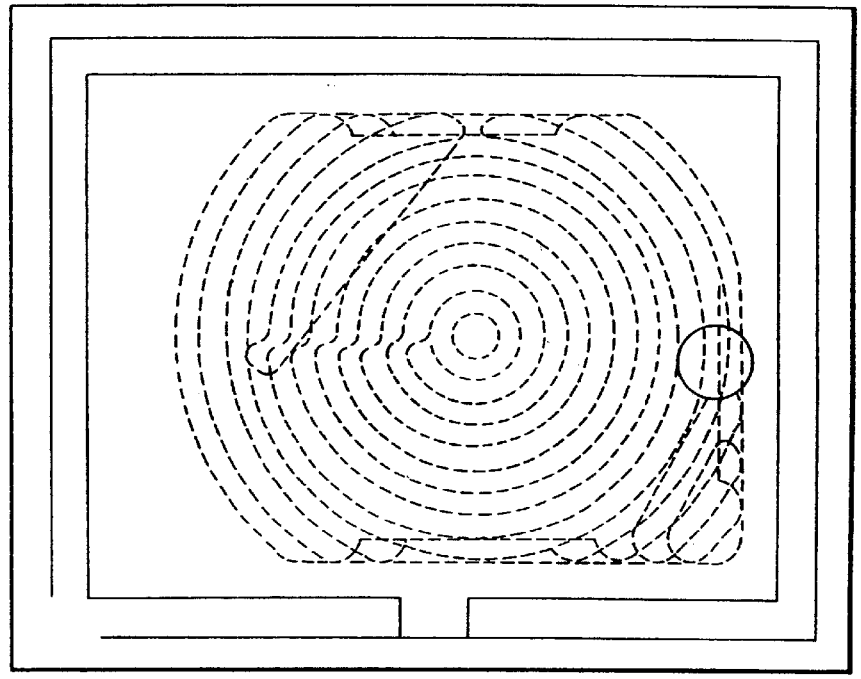
Figure 9E:
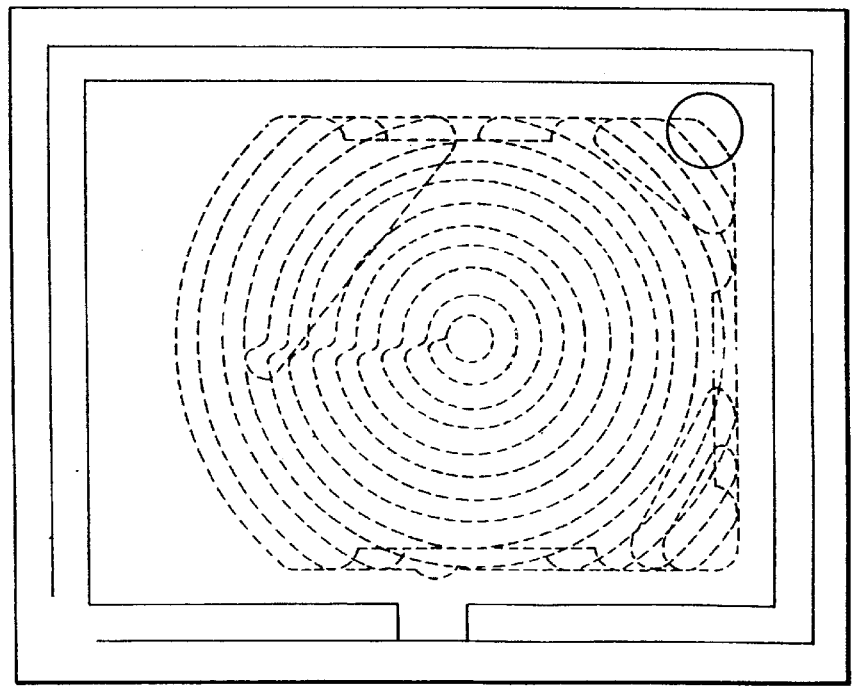

This process continues until all the workpiece is machined, following the steps described above, regardless of the number of areas where material is left, such as in corners. The cutting tool pecks out all materials in these corners, always progressing from the open areas where material is already machined away as shown in FIGS. 9D and 9E. After machining along an initial boundary, the remaining material is analyzed to determine the new subsequent boundary to be used for cutting.

Figure 9F:
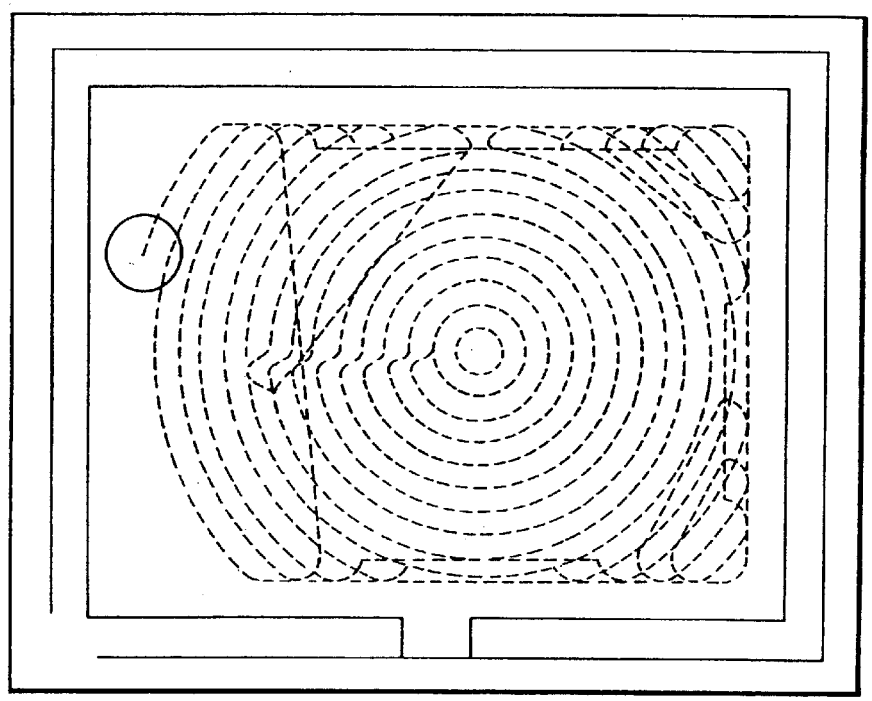
Figure 9G:
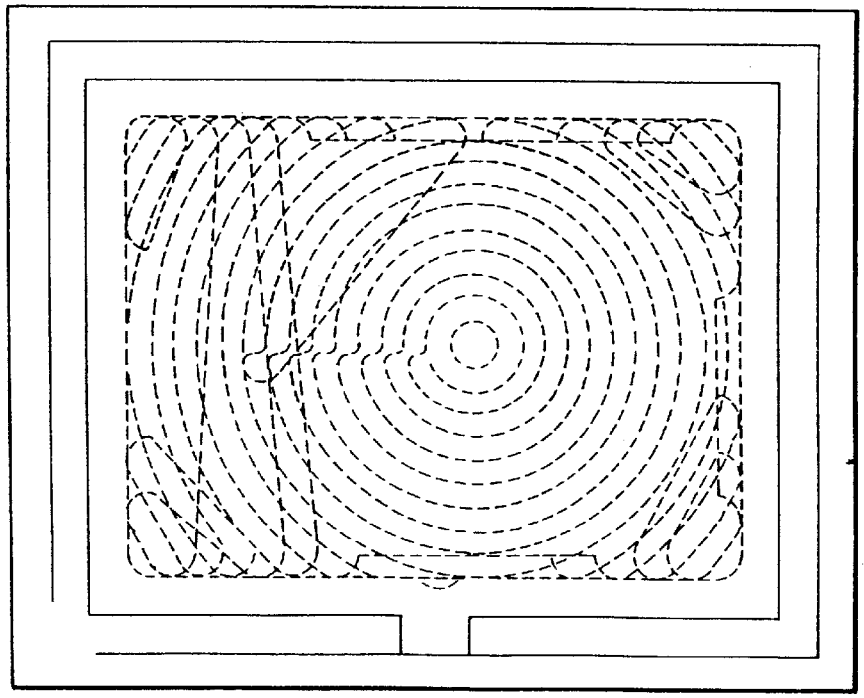

After machining along a boundary, the cutting tool exits the workpiece using the helical spline exit motions and the cutting tool connects in rapid to a point above the point where the helical spline approach needs to start. The connection happens at a safe height. The process continues until there is no material left, as shown in FIGS. 9F and 9G.

Figure 10A:
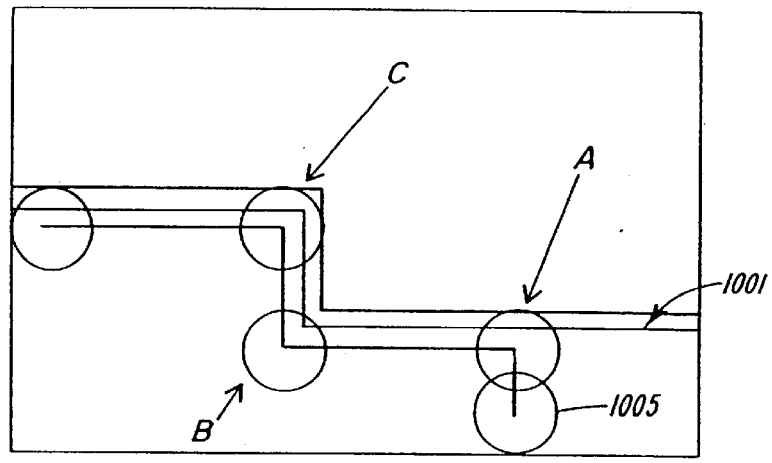
FIG. 10A is an example of a tool path in a conventional roughing method.
Figure 10B:
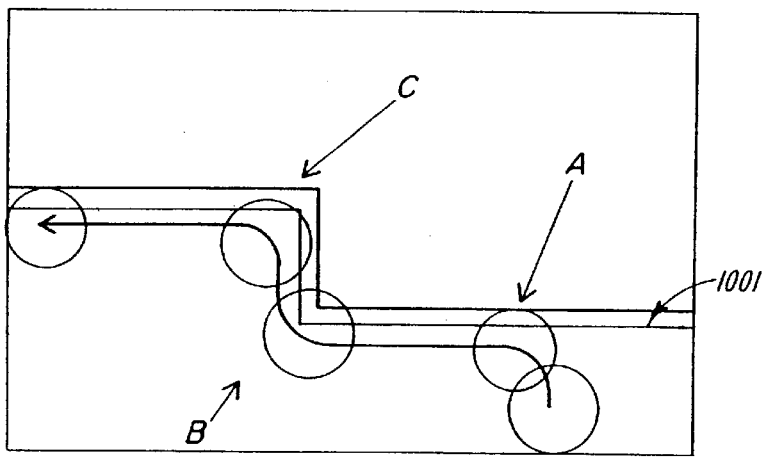
FIG. 10B is an example of a tool path in the illustrative embodiment of the present invention.

FIGS. 10A and 10B show examples of a tool path in the conventional roughing method and system and in the illustrative embodiment of the present invention, respectively. In the conventional roughing method and system, the cutting tool 1005 approaches the workpiece 1001 directly at a location designated as A as shown in FIG. 10A. The tool paths are orthogonal at an outer corner designated as B and an inner corner designated as C). In the illustrative embodiment of the present invention, however, the cutting tool approaches the workpiece in a helical spline manner at a location designated as A. The cutting tool goes round the corners B and C. The benefit of the roughing methodology provided in the illustrative embodiment of the present invention is to eliminate load spikes on the tools.

Figure 10C:
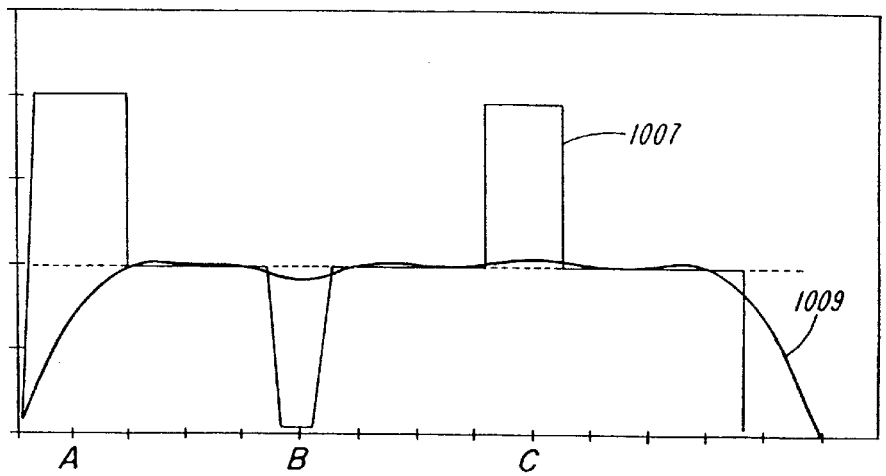
FIG. 10C is an example of a graph that shows the effect of the illustrative embodiment of the present invention relative to the conventional method and system.

FIG. 10C show the comparison of tool load acting on a cutting tool in the illustrative embodiment of the present invention relative to a conventional roughing method. The load changes 1005 on the cutting tool in the convention roughing method and system are quite severe. The tool load on the cutting tool goes up rapidly during the approach. On an outside corner, the tool goes down because the tool moves outside the material as it turns the corner. On an inside corner, the tool load goes up again. In the load changes 1009 of the illustrative embodiment of the present invention, the load spikes are eliminated by analyzing the material and building the tool path based on the material rather than the resultant geometry. In particular, the tool load maintains constant at approaching location A by a helical spline motion and at corners B and C by rounding motions.

It is apparent that there has been provided, in accordance with the present invention, a method and system for controlling a cutting tool to cut a workpiece in high speed cutting machine. While this invention has been described in conjunction with illustrative embodiments thereof, it is evident that many alternatives, modifications, and variations will be apparent to those skilled in the art. For example, the present invention can be applied to any shape of resultant product regardless of the number and location of islands. Accordingly, it is intended to embrace all such alternatives, modifications and variations that fall within the spirit and broad scope of the appended claims.

What is claimed is:

1. A computer-implemented method for machining selected portions of a workpiece by a cutting tool of a high speed cutting machine, said method comprising the steps of:

providing a horizontal slice of the selected portions of the workpiece;

determining an initial boundary of the slice, the boundary being open to the air;

generating subsequent boundaries in the selected portions of the slice, said subsequent boundaries being determined by removing the selected portions of the slice by a cutting depth of the cutting tool buried in the workpiece from the previous boundary;

generating a tool path based on the boundaries of the selected portions within the slice, said tool path being positioned in the air from the boundaries depending on the radius of the cutting tool and a predetermined value of the cutting depth of the cutting tool; and machining said selected portions by moving the cutting tool along said generated tool path maintaining the cutting tool in a climb cutting condition as the cutting tool machines the selected portions of the workpiece to provide a constant tool load on the cutting tool.

2. The computer-implemented method of claim 1, wherein said predetermined value of the cutting depth of the cutting tool is determined by analyzing the reference part, tool shape and a workpiece shape.

3. The computer-implemented method of claim 2, wherein said predetermined value of the cutting depth of the cutting tool is equal to or less than a radius of the cutting tool.

4. The computer-implemented method of claim 1, wherein said boundary determining includes:
where the selected portions of the slice have no initial boundary that is open to the air, generating an initial boundary in the selected portion of the workpiece.

5. The computer-implemented method of claim 1, wherein said boundary determining includes:
determining whether the cutting tool is able to access the boundary; and
where the cutting tool is not able to access the workpiece, generating an initial boundary by opening an area in the selected portions of the slice.

6. The computer-implemented method of claim 5, wherein said opening an area in the selected portion of the workpiece includes:
moving down the cutting tool in a spline helical manner until the depth of the slice is reached.

7. The computer-implemented method of claim 1, wherein said tool path generating comprises:
determining a tool path by moving an initial boundary into the air by a radius of the cutting tool minus the cutting depth of the cutting tool buried in the workpiece.

8. A controller for controlling a cutting tool of a high speed cutting machine, comprising:
a memory element for storing instructions for controlling the cutting tool and data regarding the workpiece required to control the cutting tool; and
a processor operated by the instructions stored in the memory element for controlling signals for a tool path of the cutting tool, said processor includes
means for horizontally slicing the selected portion of the workpiece using the data regarding the workpiece stored in the memory,
means for examining the data of a slice of the workpiece to determine an initial boundary of the selected portion of the slice,
means for generating subsequent boundary data of the selected portions of the slice, said subsequent boundary data being determined by subtracting the cutting depth of the cutting tool buried in the workpiece from the previous boundary data, and
means for generating signals for a tool path, the cutting tool path being positioned in the air remote from the boundaries depending on the radius of the cutting tool and a predetermined value of the cutting depth of the cutting tool,
wherein said cutting tool maintains a climb cutting condition as the cutting tool machines the selected portions of the workpiece to provide a constant tool load on the cutting tool.

9. The computer-implemented method of claim 1 further comprising:
ordering the cutting tool path to minimize a traveling distance of the cutting tool; and
connecting the cutting tool path within said selected portions of the slice to complete the cutting tool path.

10. The computer-implemented method of claim 9, wherein said connecting step includes:
determining whether an initial boundary of the selected portions of the slice is a closed loop; and
where the boundary is a closed loop, connecting a tool path generated based on the closed loop boundary to a next tool path by S motion.

11. The computer-implemented method of claim 9, wherein said connecting step includes:
accessing a starting end of an open loop tool path by a helical spline motion; and
exiting an ending position of an open loop tool center line by a helical spline motion.

12. The computer-implemented method of claim 1, wherein said machining step includes:
providing directional changes of the cutting tool along substantially helical trajectories so as to minimize sudden directional changes.

13. The computer-implemented method of claim 1, wherein the step of generating the cutting tool path creates the cutting tool path to maximize the engagement of the cutting tool with the workpiece.

14. The computer-implemented method of claim 1, wherein the step of generating the cutting tool path creates the cutting tool path such that the cutting tool machines the workpiece, when possible, from outside of the workpiece.

15. The computer-implemented method of claim 1, wherein the step of generating the cutting tool path creates the cutting tool path such that the cutting tool enters a portion of the workpiece without a border with the outside environment along a substantially helical trajectory.

16. The controller of claim 8, wherein the cutting tool rotates at a rate higher than 60,000 rpm while machining the workpiece.

17. The controller of claim 8, wherein said predetermined value of the cutting depth of the cutting tool is determined by analyzing the reference part, tool shape and a workpiece shape.

18. The controller of claim 17, wherein said predetermined value of the cutting depth of the cutting tool is equal to or less than a radius of the cutting tool.

19. The controller of claim 8 further comprising means for generating an initial boundary in the selected portion of the workpiece for the cutting tool to access.

20. The controller of claim 19 further comprising means for generating signal for moving down the cutting tool in a spline helical manner until the depth of the slice is reached, to open up an area for the cutting tool to access.

21. The controller of claim 8, wherein said tool path is determined by moving boundaries into the air by a radius of the cutting tool minus the cutting depth of the cutting tool buried in the workpiece.

22. The controller of claim 8, wherein said cutting tool enters a portion of the workpiece without a border with the outside environment from outside of the workpiece along a substantially helical trajectory.

23. The controller of claim 8, wherein said processor further comprises:
means for ordering the cutting tool path to minimize a traveling distance of the cutting tool; and means for connecting the cutting tool path within said selected portions of the slice to complete the cutting tool path.

24. The controller of claim 23, wherein said tool path of a closed loop boundary is connected to a next tool path by S motion.

25. The controller of claim 23, wherein said directional changes of the cutting tool is provided along substantially helical trajectories so as to minimize sudden directional changes and characterized by maximizing engagement of the cutting tool with the workpiece.

26. The controller of claim 23, wherein said cutting tool accesses a starting end of an open loop tool path by a helical spline motion.

27. The controller of claim 23, wherein said cutting tool exits an ending position of an open loop tool path by a helical spline motion.

28. The controller of claim 8, wherein said cutting tool machines the workpiece, when possible, from outside of the workpiece.

\* \* \* \* \*